(12) United States Patent
Yang et al.

(10) Patent No.: US 6,277,950 B1
(45) Date of Patent: Aug. 21, 2001

(54) ORGANIC-SOLUBLE AROMATIC POLYIMIDES, ORGANIC SOLUTIONS AND PREPARATION THEREOF

(75) Inventors: Chin-Ping Yang; Sheng-Huei Hsiao; Shin-Hung Chen, all of Taipei (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/491,131

(22) Filed: Jan. 26, 2000

(51) Int. Cl.$^7$ ............................. C08G 73/10; C08G 69/26
(52) U.S. Cl. ..................... 528/353; 528/125; 528/126; 528/128; 528/170; 528/171; 528/172; 528/173; 528/174; 528/175; 528/176; 528/179; 528/183; 528/185; 528/188; 528/220; 528/229; 528/350; 528/351
(58) Field of Search ...................... 528/125, 128, 528/170, 126, 171, 172, 173, 174, 175, 176, 179, 183, 185, 188, 220, 229, 350, 353

(56) References Cited

U.S. PATENT DOCUMENTS

| | | | |
|---|---|---|---|
| 5,340,904 | * | 8/1994 | Yang et al. ............... 528/185 |
| 5,414,070 | * | 5/1995 | Yang et al. ............... 528/310 |
| 5,886,131 | * | 3/1999 | Yao et al. ................ 528/185 |
| 5,977,289 | * | 11/1999 | Yang et al. ............... 528/185 |
| 6,060,575 | * | 5/2000 | Yang et al. ............... 528/188 |
| 6,093,790 | * | 7/2000 | Yang et al. ............... 528/353 |

OTHER PUBLICATIONS

Hsiao et al "Synthesis and Properties of Polyimides from Ortho–Linked Bis(Etheramines)", 22nd Polymer Conference, Hsinchu, Taiwan, pp. 283–284, Jan. 28, 1999.*

* cited by examiner

*Primary Examiner*—P. Hampton-Hightower
(74) *Attorney, Agent, or Firm*—Jackson Walker L.L.P.

(57) ABSTRACT

The present invention provides polyimides and co-polyimides that are organosoluble. The polyimides and co-polyimides are prepared from an aromatic diamine having ortho-linked phenylene and pendant tert-butyl group, i.e., 1,2-bis(4-aminophenoxy)-4-tert-butyl-benzene, or its mixture with other diamines, and a mixture of dianhydrides that containing at least one dianhydride selected from s-BPDA, DSDA, ODPA, 6FDA and other diether-dianhydrides.

26 Claims, No Drawings

ORGANIC-SOLUBLE AROMATIC POLYIMIDES, ORGANIC SOLUTIONS AND PREPARATION THEREOF

FIELD OF THE INVENTION

The present invention relates generally to a formulation and preparation method of a kind of tractable polyimides that are organic-soluble with controllable solubility.

BACKGROUND OF THE INVENTION

Aromatic polyimides were well known as polymeric materials of high performance for their excellent thermal stabilities and balanced mechanical and electric properties. Polyimides were mainly used in the aerospace and electronic industries in the forms of films and moldings. Other uses for these polymers such as adhesives, gas separation membranes, composite matrices, coatings, and foams were rapidly increasing. However, aromatic polyimides are difficult to be processed because of high softening temperatures and limited solubilities in commercially available solvents; accordingly the improvements to their solubility and heat plasticity without decreasing their original excellent characteristics are the aims of the present researchers.

The literature is flooded with claims of polyimides according to our specific paper and patent search for soluble polyimides. Most of the literature described the improvement of diamines and relatively less literature described the invention of dianhydrides in the preparation of organosoluble polyimides. The diamines used in the synthesis of organosoluble polyimides have in general three kinds of structures. The first type is polyimides prepared from a polysiloxane diamine, which have an improved adhesion with a semiconductor substrate but suffer poorer thermal properties and strength of films. The second type is polyimides prepared from a diamine having two meta amino groups [such as, 3,3-diaminodiphenylsulfone and 1,3-bis(3-aminophenoxy)benzene], which have enhanced solubility but a lower degree of polymerization due to poor reactivity of the diamine. The third type is polyimides prepared from a diamine having two para amino groups, which will have organosolubility only when the diamines have more than one flexible connector groups selected from isopropyl, hexafluoroisopropyl, ether and sulfone [such as 2,2-bis[4-(4-aminophenoxy)phenyl]propane, 2,2-bis[4-(4-aminophenoxy)phenyl ]hexafluoropropane, and bis[4-(4-aminophenoxy)phenyl]sulfone.

Our specific paper and patent search for organosoluble polyimides based on diamine are listed as follows:

(a) Patents

| | |
|---|---|
| JP 09118,808 (1997) | Chemical Abstract 127: 52287j |
| EP 729,996 (1996) | Chemical Abstract 125: 276948x |
| U.S. Pat. No. 5,480,965 (1996) | Chemical Abstract 124: 345157g |
| JP 07-224,152 (1995) | Chemical Abstract 124: 31222g |
| JP 07-310,048 (1995) | Chemical Abstract 124: 291209e |
| EP 639,621 (1995) | Chemical Abstract 123: 85015q |
| JP 07-224,151 (1995) | Chemical Abstract 123: 315836q |
| JP 07-224,150 (1995) | Chemical Abstract 123: 315835p |
| JP 06-172,524 (1994) | Chemical Abstract 121: 281875t |
| JP 06-172,523 (1994) | Chemical Abstract 121: 281874s |
| JP 06-172,525 (1994) | Chemical Abstract 121: 281876u |
| U.S. Pat. No. 5,212,279 (1993) | Chemical Abstract 119: 251699e |
| JP 04-337,326 (1992) | Chemical Abstract 119: 73356f |
| JP 04-108,879 (1992) | Chemical Abstract 117: 92386r |
| JP 04-108,880 (1992) | Chemical Abstract 117: 92387s |
| EP 438,751 (1991) | Chemical Abstract 115: 234851y |
| U.S. Pat. No. 4,931,539 (1990) | Chemical Abstract 113: 133121p |
| JP 02-43,221 (1990) | Chemical Abstract 113: 41153c |
| JP 02-92,930 (1990) | Chemical Abstract 113: 116471k |
| JP 02-286,706 (1990) | Chemical Abstract 115: 115256y |
| EP 284,803 (1988) | Chemical Abstract 110: 155428j |
| JP 63-00,353 (1988) | Chemical Abstract 109: 46242c |
| JP 62-265,326 (1987) | Chemical Abstract 108: 133522s |
| JP 61-108,627 (1986) | Chemical Abstract 106: 20093t |
| JP 61-241,358 (1986) | Chemical Abstract 106: 157082h |
| JP 61-57,620 (1986) | Chemical Abstract 105: 153750f |
| JP 61-59,334 (1986) | Chemical Abstract 105: 200510q |
| EP 194,865 (1986) | Chemical Abstract 105: 228674v |
| JP 60-217,261 (1985) | Chemical Abstract 104: 188323a |
| JP 49-12,592 (1974) | Chemical Abstract 83: 62006d |
| JP 49-19,119 (1974) | Chemical Abstract 82: 126002p |
| JP 49-18,639 (1974) | Chemical Abstract 82: 125993a |
| JP 49-30,717 (1974) | Chemical Abstract 82: 112854f |
| JP 49-18,118 (1974) | Chemical Abstract 82: 58904g |
| JP 46-17,145 (1971) | Chemical Abstract 75: 118915d |
| Fr 1,539,074 (1968) | Chemical Abstract 71: 4608t |

(b) Articles

1. Arnold, C. A.; etc.; Polymer 30, 986 (1989).
2. Omote, T.; etc.; Polym. Eng. Sci. 29, 945 (1989).
3. Lee, H.-R; etc; Macromolecules. 23, 502 (1990).
4. Arnold, F. E,; etc.; J. Mater. Chem. 3, 353 (1993).

Our specific paper and patent search for organosoluble polyimides based on diether-diamine:

1. Yang C.-P; Lin J.-H, J. Polym. Sci., Part A:, 31, 2153 (1993).
2. Yang C.-P; Chen W.-T, J. Polym. Sci., Part A:, 31, 2799 (1993).
3. Yang C.-P; Chen W.-T, Macromol. Chem., 194, 3061 (1993).
4. Yang C.-P; Chen W.-T, Macromolecules, 26, 4865 (1993).
5. Yang C.-P; Lin J.-H, J. Polym. Sci., Part A:, 32, 423 (1994).
6. Yang C.-P; Lin J.-H, J. Polym. Sci., Part A:, 32, 369 (1994).
7. Hsiao S.-H; Yang C.-P; Fan J.-C, J. Polym. Res., 1, No. 4, 345 (1994).
8. Hsiao S.-H; Yang C.-P; Lin C.-K, J. Polym. Res., 2, No. 1, 1 (1995).
9. Yang C.-P; Hsiao S.-H; Jang C.-C, J. Polym. Sci., Part A:, 33, 1487 (1995).
10. Yang C.-P; Lin J.-H, Polymer, 36, 2607 (1995).
11. Yang C.-P; Lin J.-H, Polymeric Materials Encyclopedia, 9, 6214 (1996).
12. Hsiao S.-H; Yang C.-P; Yang C.-Y, J. Polym. Sci., Part A:, 35, 1469 (1997).
13. Liaw D.-J; Liaw B.-Y, Polym. J.,28, 970 (1996).

The diamine, 1,4-bis(4-aminophenoxy)-2-tert-butylbenzene, was first disclosed in U.S. Pat. No. 5,085,676 (1992). The assignee of this U.S. patent, Du Pont Company, has claimed that the polyamides synthesized from this diamine, 1,4-bis(4-aminophenoxy)-2-tert-butylbenzene, possess a potential application as a gas separation membrane.

SUMMARY OF THE INVENTION

The present invention provides a formulation and preparation method of a kind of tractable polyimides and co-polyimides that are organic-soluble with controllable solubility and also exhibit comparable thermal properties and mechanical properties. The series of organosoluble polyimides (Pls) and co-polyimides of the present invention are prepared from a specific romatic diamine having a tert-butyl group, 1,2-bis(4-aminophenoxy)-4-tert-butylbenzene, or a mixture of this specific aromatic diamine and other diamines with various dianhydrides.

The present invention also provides an organic solution of a polyimide and an organic solution of a co-polyimide, wherein the polyimide and co-polyimide are prepared from the specific aromatic diamine, 1,2-bis(4-aminophenoxy)-4-tert-butylbenzene, and the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, tetrahydrofuran (THF), chloromethane, and chloroethane.

The present invention further discloses methods for forming a polyimide film and a co-polyimide film, which comprise the following common steps: mixing the polyimide or the co-polyimide of the present invention and the organic solvent described above to form an organic solution; casting or coating said organic solution on a substrate to form a layer; and removing said solvent from said layer to form a polyimide or co-polyimide film.

DETAILED DESCRIPTION OF THE INVENTION

In general the polyimide films are prepared by heating a precursor of the polyimide, polyamic acid (PAA), because most of the conventional polyimides (Pls) can not easily dissolve in an organic solvent. Therefore, it is not feasible to form a polyimide film on a substrate which is adversely affected by high temperature. Further, the polyimide is difficult to be processed because of high softening temperature thereof, limited solubility in commercially available solvents thereof, and poor moist and thermal stability of poly(amic acid). In the present invention, a specific diamine having the following formula 11, 1,2-bis(4-aminophenoxy)-4-tert-butylbenzene, is prepared and used in the preparation of organosoluble polyimides, which also have excellent mechanical and thermal properties. In this invention we also provide a preparation method for a series of organosoluble co-polyimides, which can be prepared from the specific diamine (II) together with a conventional diamine and one or more than one dianhydrides. The solubility of co-polyimides is varied with the ratio of the specific diamine (II) and the conventional diamine used.

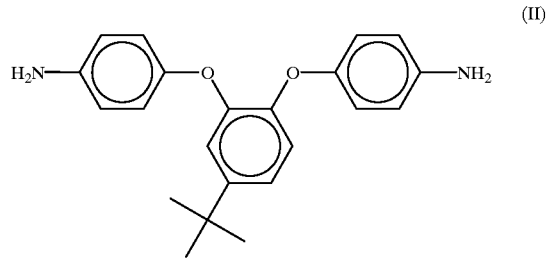

(II)

Certain dianhydrides ($Ar_3$) known in the art are suitable for use in the present invention to synthesize the organosoluble polyimides and co-polyimides. These dianhydrides ($Ar_3$) include (but not limited to) some commercially available dianhydrides, such as biphenyl tetracarboxylic dianhydride (s-BPDA), diphenylsulfone tetracarboxylic dianhydride (DSDA), 4,4'-oxydiphthalic anhydride (ODPA) and 2,2-bis(3,4-dicarboxyphenyl)hexafluoropropane dianhydride (6FDA); and some bis(ether anhydride)s derived from aromatic diols, such as 1,4-bis(3,4-dicarboxyphenoxy)-2-tertbutylbenzene dianhydride (t-BBDA), 1,2-bis(3,4-dicarboxyphenoxy)benzene dianhydride, 2,3-bis(3,4-dicarboxyphenoxy)naphthalene dianhydride, 2,2'-bis(3,4-dicarboxyphenoxy)biphenyl dianhydride, 2,2-bis[4-(3,4-dicarboxyphenoxy)-phenyl]hexafluoropropane dianhydride (6FDEDA), 1,1-bis[4-(3,4-dicarboxyphenoxy)phenyl]cyclohexane dianhydride. The polyimides prepared from the specific diamine (II) and the dianhydrides as described above show excellent organosolubility. It is apparent that some dianhydrides ($Ar_4$), such as pyromellitic dianhydride (PMDA) and BTDA, which will form organo-insoluble polyimides can be mixed with the dianhydrides described above in various proportions to adjust the organosolubility in the synthesis of the co-polyimides of the present invention. The physical properties of the co-polyimides of the present invention (such as, mechanical properties, thermal stability, adhesion properties) will also be adjusted by changing the ratio of the two different dianhydrides ($Ar_3$ and $Ar_4$).

The organosoluble polyimides and co-polyimides prepared according to the present invention can be represented by the following formula I:

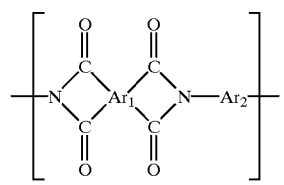

I

When only one dianhydride and one diamine are used, $Ar_1$ of the formula I is represented by the following $Ar_3$, and $Ar_2$ is represented by the following: $Ar_2$:

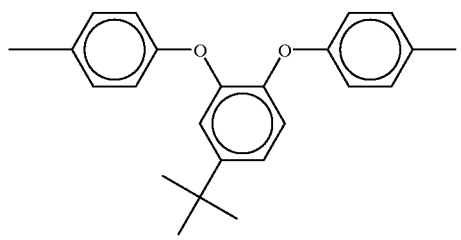
Ar₃:
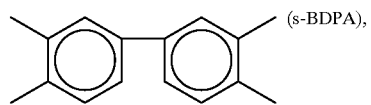
(s-BDPA),
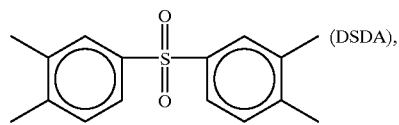
(DSDA),
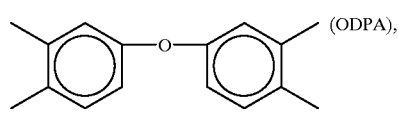
(ODPA),
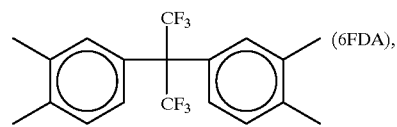
(6FDA),
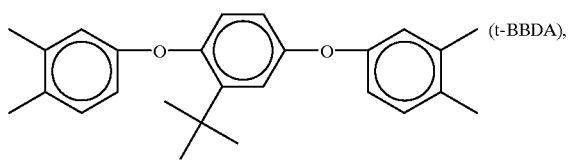
(t-BBDA),
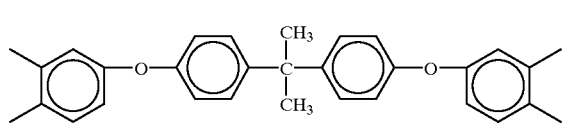
(DEDA),
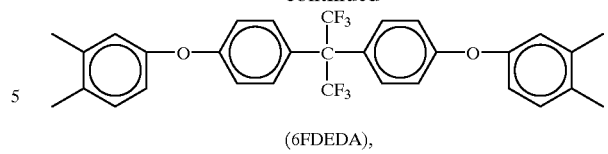
(6FDEDA),
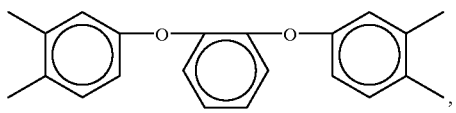
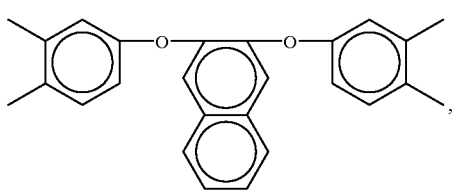
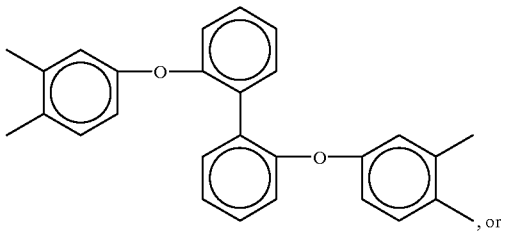
, or
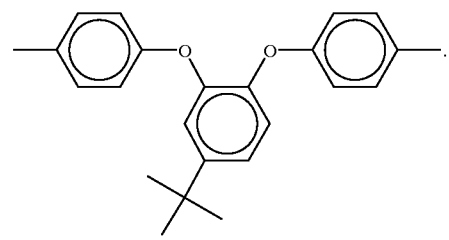
.
When two different dianhydrides and one diamine are used, the formula I can be rewritten as follows:
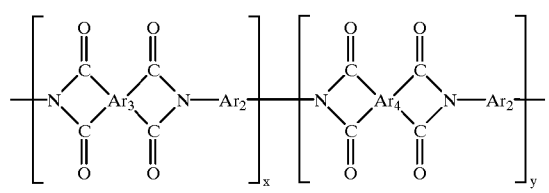
wherein Ar₂ is defined as above, Ar₃ is defined as above and Ar₄ is

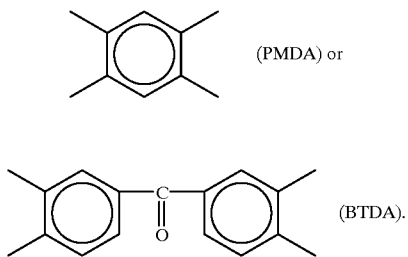

(PMDA) or (BTDA).

The units containing $Ar_3$ and $Ar_4$ are randomly arranged in the formula I. Preferably, the x and y are so arranged that (the units containing $Ar_3$):(the units containing $Ar_4$)= 100:0~5:95 (by weight).

Similarly, $Ar_2$ of the formula I can be contributed by two different diamines. In this case the formula I can be rewritten as follows:

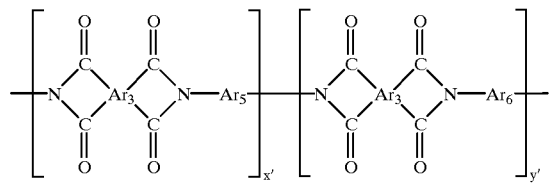

wherein $Ar_3$ is defined as above, $Ar_5$ is the same as $Ar_2$ defined as above and $Ar_6$ is

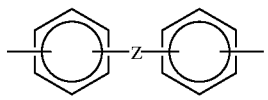

Z=O, S, $CH_2$, CO, $SO_2$, $C(Me)_2$, $C(CF_3)_2$, $CR^1R^2$, $X$—$C_6H_4$—$X$, $X$—$C_{10}H_8$—$X$, $X$—$C_6R^1$, $R^2$, $R^3$, $R^4$—$X$, or $X$—$C_6H_4$—$Y$—$C_6H_4$—$X$ or a polysiloxane main chain;
wherein X=O, S, $CR^1R^2$;and
Y=O, S, $CH_2$, CO, $SO_2$, $C(Me)_2$, $C(CF_3)_2$, $CR^1R^2$, aliphatic chain, or $C_6H_{10}$;
wherein $R^1$, $R^2$, $R^3R^4$=H, halogen, Me, $CF_3$, or $C(Me)_3$ wherein Me=methyl group.

The units containing $Ar_5$ and $Ar_6$ are randomly arranged in the formula I. Preferably, the x' and y' are so arranged that (the units containing $Ar_5$):(the units containing $Ar_6$)= 100:0~5:95 (by weight).

It is apparent that the organosoluble co-polyimide (I) can be prepared from two different diamines and two different dianhydrides according to the present invention, and the formula I can be rewritten as follows:

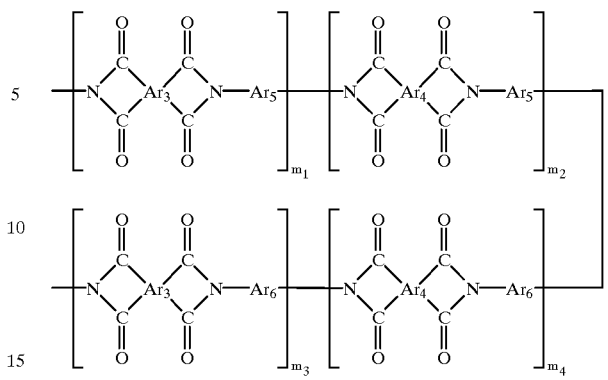

wherein $Ar_3$, $Ar_4$, $Ar_5$ and $Ar_6$ are defined as above; and the four different units are randomly arranged in the formula I. Preferably, $m_1$, $m_2$, $m_3$ and $m_4$ are so arranged that the units containing Ar. is greater than 5 wt % and the units containing $Ar_3$ is greater than 5 wt % based on the weight of the co-polyimide.

The $Ar_6$ may be an unit from a polysiloxane diamine. A co-polyimide prepared from the polysiloxane diamine has an increased adhesion between a semiconductor and the co-polyimide.

Polyimides and co-polyimides of the present invention can be synthesized from various dianhydrides with various diamines by the conventional two-stage process that includes ring-opening polyaddition to the poly(amic acid)s in an appropriate solvent (such as DMAC) followed by chemical (additions of acetic anhydride and pyridine ($Ac_2O$/Py)) or thermal cyclodehydration to the co-Pls and Pls. Polyimides and co-polyimides can also be prepared from the conventional one-stage process by heating the two reactants directly in a solvent having a high boiling point (such as m-cresol). The reactions for preparing Pls and co-Pls are showed in the following equations:

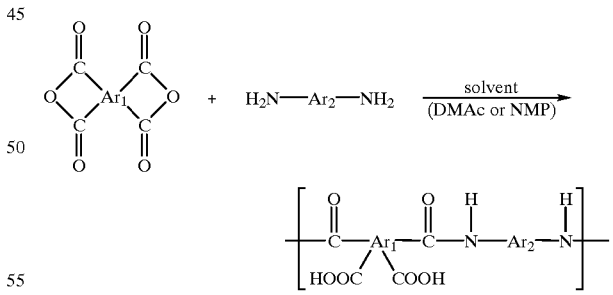

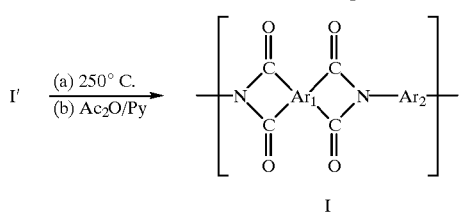

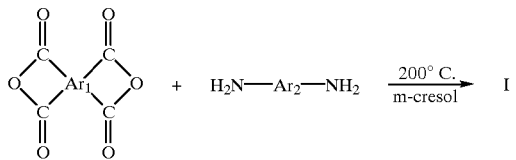

wherein $Ar_1$ and $Ar_2$ are defined as above.

EXAMPLE 1

Synthesis of 1,2-bis(4-aminophenoxy)-4-tert-butylbenzene (II)

16.6 g (0.1 mol) 4-tert-butyl-1,2-benzenediol was dissolved in 100 mL DMF, and to the resulting solution 21 g (0.15 mol) potassium carbonate and 32.3 g p-chloronitrobenzene were added and reacted at 150–160° C. for 6 hrs while stirring. 120 mL methanol was added to the reaction mixture after being cooled to form a precipitate. The precipitate was collected by filtration, washed with water, dried and then recrystallized with acetic acid to yield 38.4 g dinitro compound. Yield: 94%. mp 148–149° C. 37 g of the obtained dinitro compound [1,2-bis(4-nitrophenoxy)-4-tert-butylbenzene], 0.12 g of 10% Pd-C, and 200 mL ethanol were introduced into a three-necked flask to which 16 mL of hydrazine monohydrate ($H_2NNH_2H_2O$) was added dropwise at 80° C. After the addition was complete, the mixture was heated until nitrogen disappeared. The mixture was then filtered when it was still hot to remove Pd/C and concentrated under reduced pressure After cooling, 1,2-bis(4-aminophenoxy)-4-tert-butylbenzene (II) in the form of colorless needle crystal was collected with a nucleating agent. Yield: 24.3 g (94%). mp 132–133° C.

Elemental Anal $C_{22}H_{24}O_2N_2$(348.44); Calcd.: C, 75.83%; H, 6.94%; N, 8.04%. Found: C, 75.81%; H, 6.95%; N, 7.87%.

EXAMPLE 2

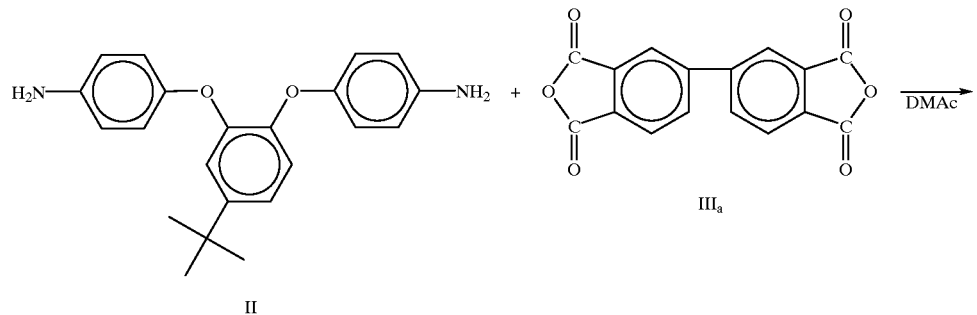

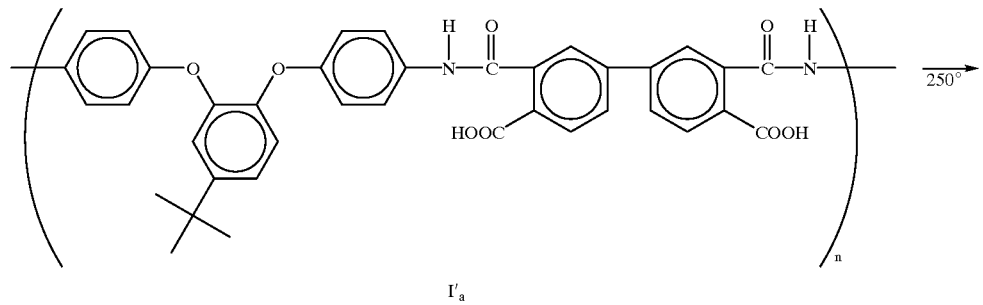

-continued

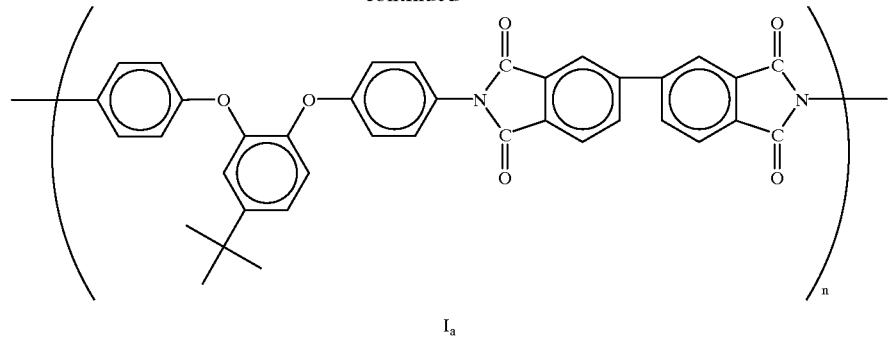

$I_a$

Diamine II (2.0 mml) [1,2-bis(4-aminophenoxy)-4-tert-butylbenzene] was dissolved in 10 ml of dried DMAc in a 25-ml flask. After the diamine was dissolved completely, biphenyl tetracarboxylic dianhydride (s-BPDA) (III$_a$) was added in two separate batches (total 2.0 mmol). The mixture was stirred at room temperature for 1 hr and a high viscosity poly(amic acid) (PAA) (I'$_a$) was obtained (1.2 dl/g in DMAc at 30° C.). The PAA solution was spread over a glass plate, and was placed in a 80° C. oven 0.5 hr to remove the solvent. The semidried PAA film was heated at 100° C., 130° C., 160° C., 190° C., 220° C. and 250° C. for 10 minutes per heating temperature. By being soaked in water, a PI film (I$_a$) was self-stripped off from the glass surface.

Ad The resulting polymer I$_a$ has a strength at break of 104 MPa, an elongation to break of 10% and an initial modulus of 2.55 GPa. Tg of the polymer I$_a$ is 240° C. and the decomposition temperature at which 10% weight loss is recorded at a heating rate of 20° C./min (Td) is 5750° C. The polymer I$_a$ has an inherent viscosity of 0.94 dl/g measured at a concentration of 0.5 g/dl in NMP at 30° C. The polymer I$_a$ is soluble in NMP and m-cresol, but only slightly soluble in DMAc.

EXAMPLE 3

The diamine and dianhydride, and the amounts thereof used in this changed to 10 ml of m-cresol. The reaction mixture was heated at 60° C. for 0.5 hr while stirring, and then placed in an oil bath for further heating from 100° C. to 200° C. within 0.5 hr and for another two hours at 200° C. while stirring. The reaction mixture was cooled and poured into methanol to form a precipitate, which was collected and dried to obtain polyimide product. The polyimide obtained has an inherent viscosity of 1.04 dl/g (NMP, 0.5 g/dl, 30° C.) and is soluble in NMP and m-cresol.

EXAMPLE 4

The procedures of Example 2 were repeated except that s-BPDA was replaced by various dianhydrides such as DSDA (III$_b$), ODPA (III$_g$), 6FDA (III$_d$), BTDA (III$_e$), PMDA (III$_f$), and t-BBDA (III$_g$) The chemical structure, solubility and mechanical properties of the resulting polyimides (PI) are listed in Tables 1 and 2.

TABLE 1

| PI | |
|---|---|
| I$_b$ | 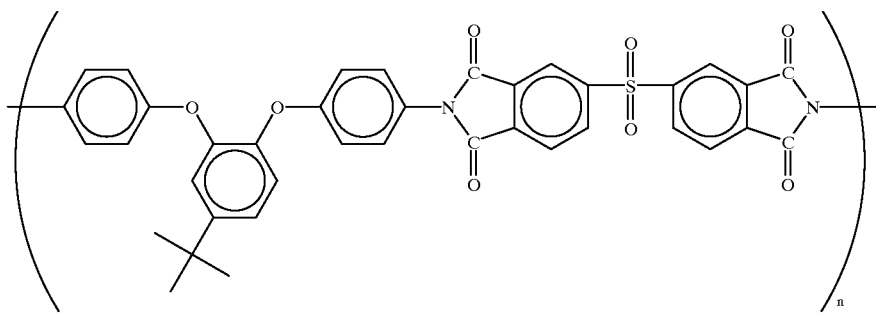 |

TABLE 1-continued
I_c
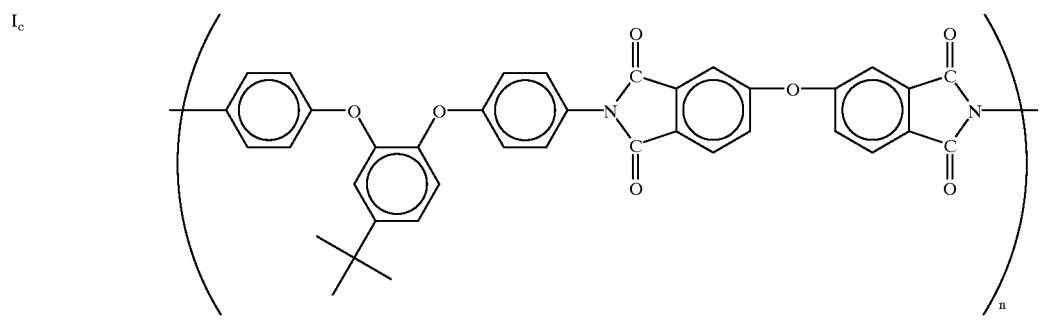
I_d
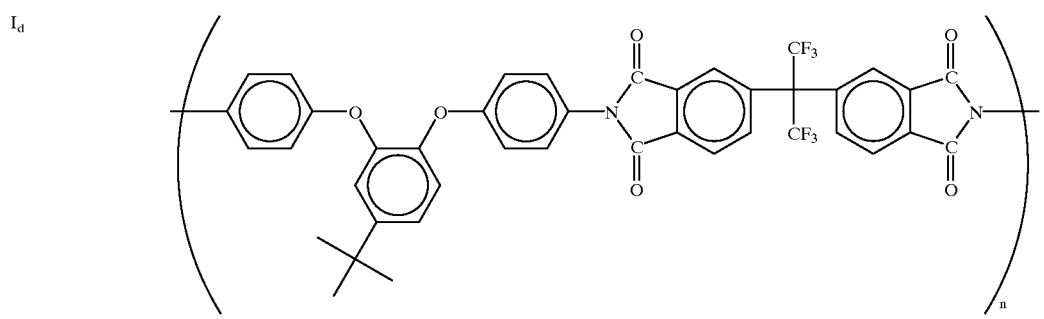
I_e
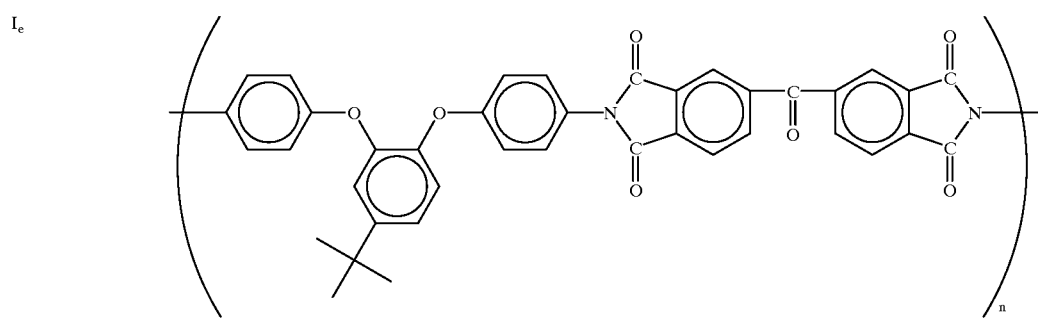
I_f
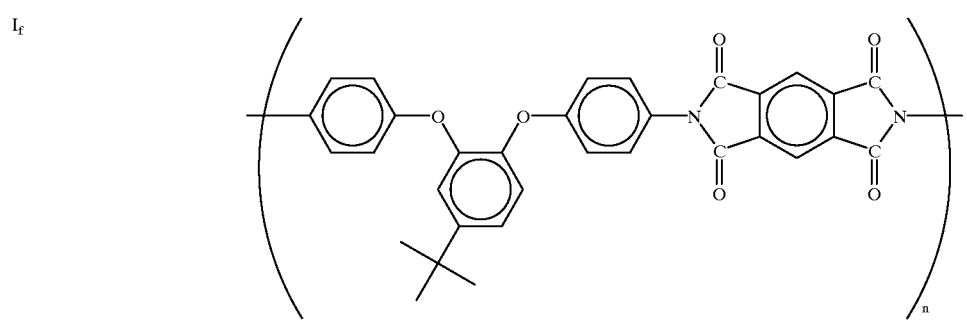

TABLE 1-continued

I_g
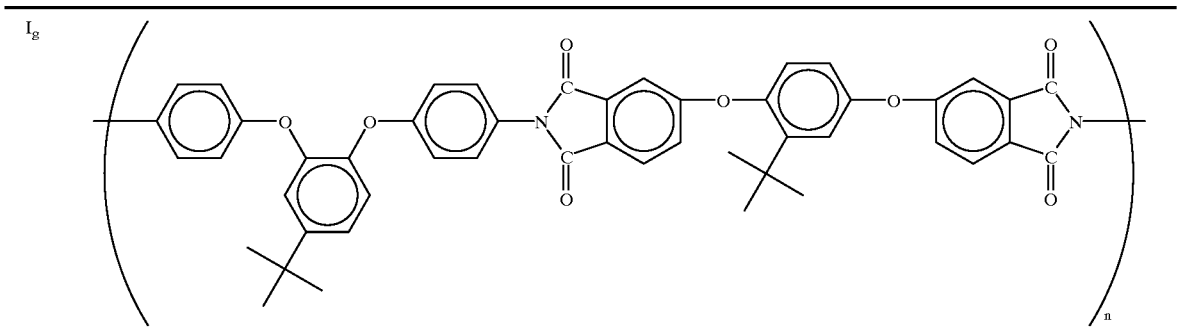

I_a
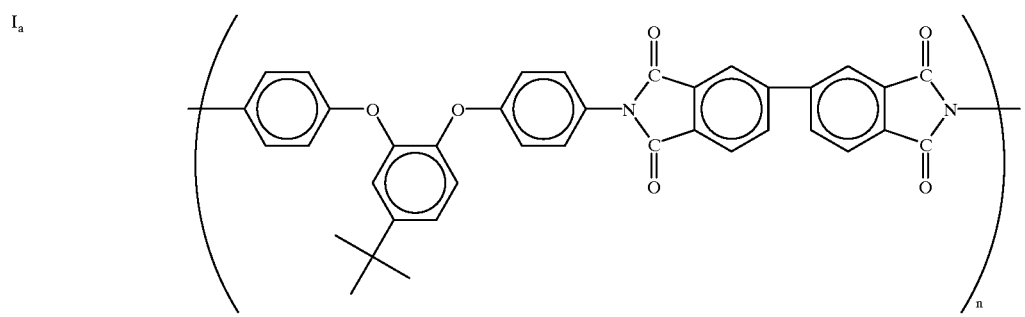

| PI | η_inh (PAA) dl/g | Film PAA | Film PI | Solubility* NMP | DMAc | DMF | DMSO | m-cresol | THF |
|---|---|---|---|---|---|---|---|---|---|
| I_b | 1.38 | tough | tough | + | + | + | + | + | +− |
| I_c | 1.00 | tough | tough | + | + | + | + | + | + |
| I_d | 1.20 | tough | tough | + | + | + | + | + | + |
| I_e | 1.38 | tough | tough | − | − | − | − | − | − |
| I_f | 1.60 | tough | brittle | − | − | − | − | − | − |
| I_g | 1.86 | tough | tough | + | + | + | − | + | + |
| I_a | 1.20 | tough | tough | + | +− | +− | − | + | − |

*Measured at a concentration of 0.5 wt %; +: soluble at room temperature; −: insoluble; +−: partially soluble at room temperature.

TABLE 2

| PI | Strength at break (MPa) | Elongation to break (%) | Initial modulus (GPa) |
|---|---|---|---|
| I_b | 97 | 6 | 2.17 |
| I_c | 109 | 11 | 2.52 |
| I_d | 94 | 8 | 1.96 |
| I_e | 103 | 9 | 2.06 |

As shown in Table 1, the diamine (II) is able to be used in preparing organosoluble polyimides with various dianhydrides except the two dianhydrides (III_e and III_f).

EXAMPLE 5 (Control)

The diamine (II) used in Example 2 was replaced by various bis(ether amine)s such as ①,4-bis(4-aminophenoxy)benzene, ② 1,3-bis(4-aminophenoxy)benzene, ③1,2-bis(4-aminophenoxy)-benzene, ④ 1,4-bis(4-aminophenoxy)-2-tert-butylbenzene, and ⑤ 2,2-bis[4-(4-aminophenoxy)phenyl]propane. The chemical structure, solubility and mechanical properties of the resulting polyimides (PI) are listed in Table 3 together with those of the polymer I_a synthesized in Example 2.

As shown in this example, only the specific diamine (II) is able to be used in preparing an organosoluble polyimide.

TABLE 3

| PI | | $\eta_{inh}$ (PAA) | solubility* NMP | DMAc |
|---|---|---|---|---|
| ① | [structure] | 1.87 | – | – |
| ② | [structure] | 1.32 | – | – |
| ③ | [structure] | 1.68 | – | – |
| ④ | [structure] | 1.20 | – | – |
| ⑤ | [structure] | 1.31 | – | – |

TABLE 3-continued

| PI | | $\eta_{inh}$ (PAA) | solubility* NMP | DMAc |
|---|---|---|---|---|
| $I_a$ | (structure) | 1.20 | + | +− |

*The solubility is defined as in Table 1

EXAMPLE 6

Copolyimides Prepared from Diamine (II) and Two Different Dianhydrides

The insoluble polyimide $I_e$ prepared from BTDA (III$_e$) in Example 4 was modified via co-polymerization in this example. The diamine (II) (2.0 mmol) was dissolved in 10 mL DMAc in a 50-mL flask. After the diamine was dissolved completely, 1.0 mmol BTDA (III$_e$) was added first and, 20 minutes later, 1.0 mmol s-BPDA (III$_a$) was added while stirring. The reaction mixture became glutinous when the stirring went on about 20 minutes. The stirring was maintained for another 60 minutes to form PAA. 2 mL of a mixture of acetic anhydride and pyridine (volume ratio 2:1) was added to the PAA solution, and was stirred at 80–100° C. for 1 hr. The polymer solution was poured into methanol to form a precipitate. The precipitate was collected by filtration after it was left one night in methanol, dried, and baked in a hot air stream at 250° C. for 20 minutes to obtain a co-polyimide $IV_a$.

Various copolyimides were also prepared by replacing the second dianhydride III$_a$ used above with DSDA (III$_b$), ODPA (III$_c$), and 6FDA (III$_d$). The chemical structure, inherent viscosity and solubility are listed in Table 4.

TABLE 4

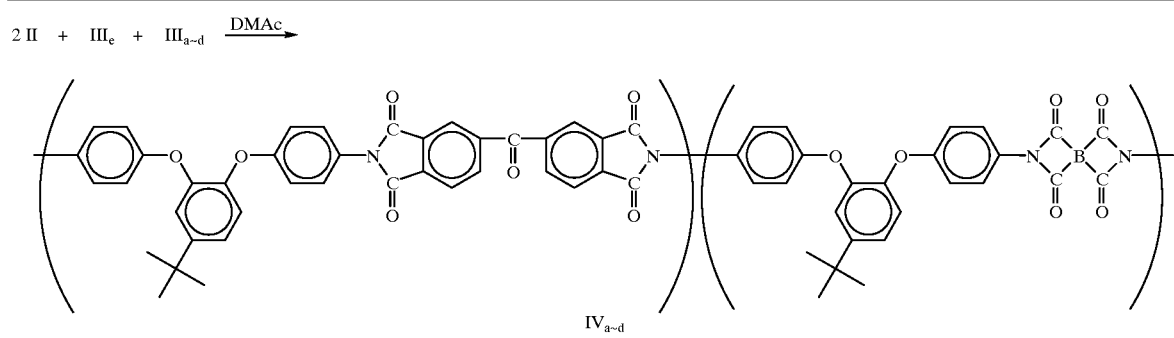

Alternating Copolyimide

| Co-PI | B** | $\eta_{inh}$ (PAA) | $\eta_{inh}$ (PI) | Solubility* NMP | DMAc | DMF | DMSO | m-cresol |
|---|---|---|---|---|---|---|---|---|
| $IV_a$ | (biphenyl structure) | 1.06 | 0.74 | + | + | + | +− | + |
| $IV_b$ | (sulfone structure) | 145 | 1.34 | + | + | + | + | + |

TABLE 4-continued

2 II + III$_e$ + III$_{a\sim d}$ $\xrightarrow{\text{DMAc}}$

[structure of IV$_{a\sim d}$]

Alternating Copolyimide

| Co-PI | B** | $\eta_{inh}$ (PAA) | $\eta_{inh}$ (PI) | NMP | DMAc | DMF | DMSO | m-cresol |
|---|---|---|---|---|---|---|---|---|
| IV$_c$ | [diphenyl ether tetramethyl structure] | 1.60 | 1.32 | + | + | + | +− | + |
| IV$_d$ | [6F tetramethyl structure] | 1.80 | 1.66 | + | + | + | + | + |

*Solubility is defined as in Table 1.
**B can be found in the formula.

The data in Table 4 show an interesting result as to the solubility of co-polyimide IV$_a$. Polyimide I$_a$ is slightly soluble and polyimide I$_e$ is insoluble in DMAc (please refer to Table 1), but the co-polyimide IV$_a$ prepared from the same dianhydrides and diamine is soluble.

EXAMPLE 7

Copolyimides Prepared from Diamine (II) and Two Different Dianhydrides

The insoluble polyimide If prepared from PMDA (III$_f$) in Example 4 was modified via co-polymerization in this example. The diamine (II) (3.0 mmol) was dissolved in 12 mL DMAc in a 50-mL flask. After the diamine was dissolved completely, 2.0 mmol s-BPDA (III$_a$) was added first and, 20 minutes later, 1.0 mmol PMDA (III$_f$) was added while stirring. The reaction mixture became glutinous when the stirring went on another 60 minutes to form PAA. The PAA solution was spread over a glass plate, and was placed in a 80° C. oven to remove the solvent. The semidried PAA film was heated from 100° C. to 250° C. at a rate of 1.5° C./min, and for 30 minutes at 250° C. By being soaked in water, a co-polyimide (co-PI) film (V$_a$) was self-stripped off from the glass surface.

Various copolyimides were also prepared by replacing the first dianhydride III$_a$ used above with DSDA (III$_b$), ODPA (III$_c$), and 6FDA (III$_d$).

The chemical structure, inherent viscosity and solubility are listed in Table 5.

TABLE 5

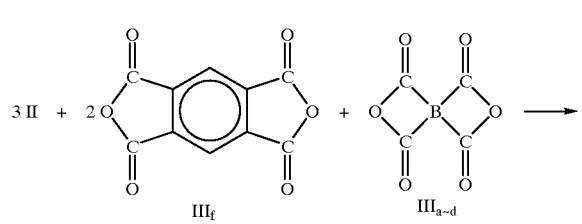

3 II + 2 III$_f$ + III$_{a\sim d}$ ⟶

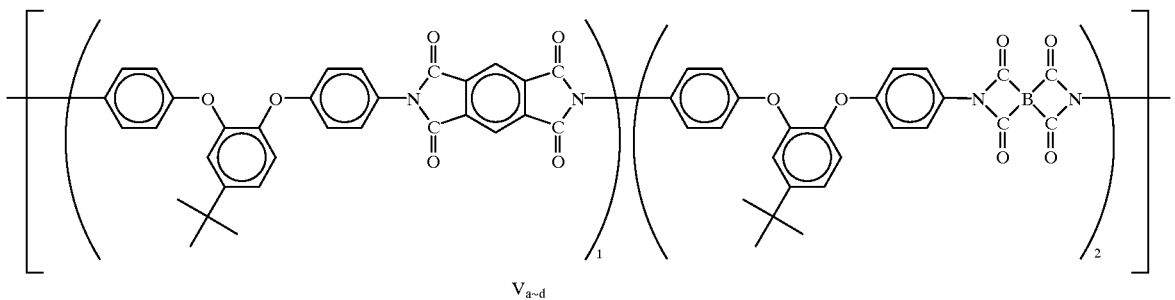

$V_{a\sim d}$

| Co-PI | B** | $\eta_{inh}$ (PAA) | $\eta_{inh}$ (PI) | Solubility* NMP | DMAc | DMF | DMSO |
|---|---|---|---|---|---|---|---|
| $V_a$ | [structure] | 1.20 | 0.82 | + | + | + | − |
| $V_b$ | [structure] | 1.25 | 0.80 | + | + | + | + |
| $V_c$ | [structure] | 1.40 | 1.07 | + | + | + | − |
| $V_d$ | [structure] | 0.95 | 0.78 | + | + | + | + |

*Solubility is defined as in Table 1.
**B can be found in the formula.

Mechanical properties of the co-polyimides $V_a$–$V_d$ are listed as follows:

|  | Strength at break (MPa) | Elongation to break (%) | Initial modulus (GPa) |
|---|---|---|---|
| $V_a$ | 92 | 10 | 2.00 |
| $V_b$ | 88 | 6 | 2.00 |
| $V_c$ | 106 | 9 | 2.00 |
| $V_d$ | 85 | 6 | 2.07 |

The data in Table 5 show that the co-polyimide $V_a$ is soluble in DMAc, which was prepared from the dianhydrides used in the syntheses of the insoluble polyimide $I_f$ and slightly soluble polyimide $I_a$. It is believed that the co-polyimides prepared in this example are block-alternating copolymers.

EXAMPLE 8

(co-PI was prepared from two different diamines and a dianhydride)

1.0 mmol of 1.3-bis(4-aminophenoxy)benzene (TPE-R) and 1.0 mmol of the diamine (II) were dissolved in 10 mL DMAc, and then 2 mmol of DSDA was added in two separate batches. The resulting mixture was stirred for 1.5 hrs to yield PAA. A co-polyimide (VI) was prepared from the PAA solution according to the procedures similar to those used in Example 2. The formula of the resulting co-PI (VI) is shown as follows:

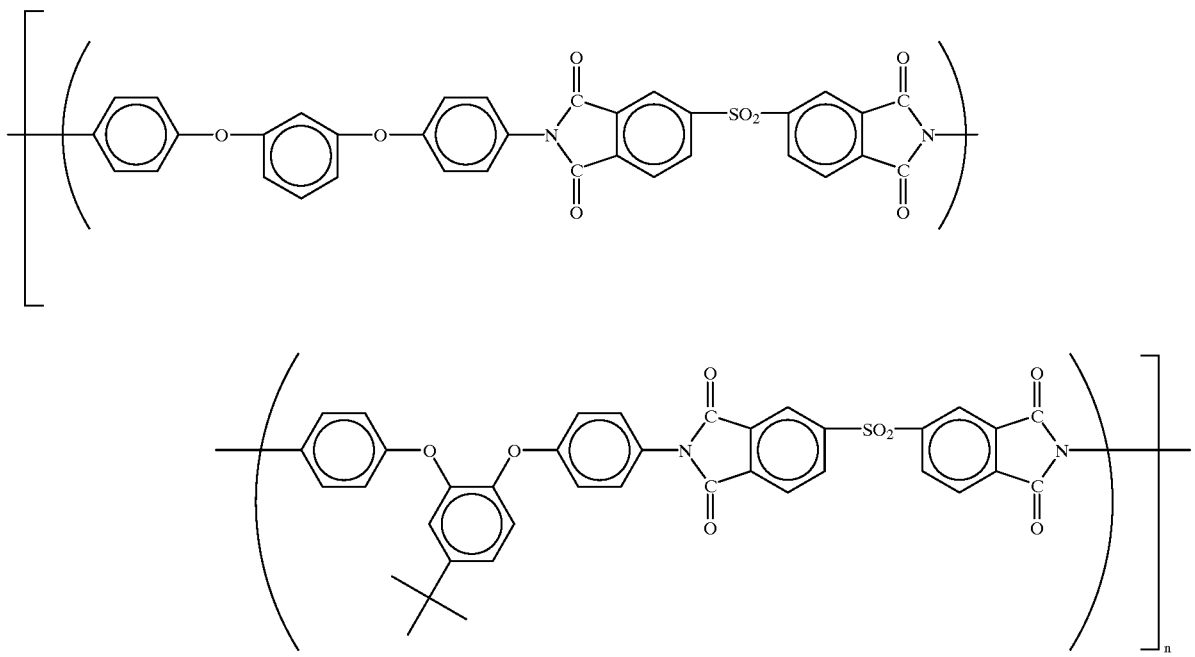

in which the constituting units are believed randomly arranged in said formula (VI). This co-PI (VI) has an inherent viscosity of 0.96 dl/g (DMAc, 30° C.) and is soluble in DMAc, NMP, DMF and m-cresol. A homopolymer of polyimide prepared from TPE-R and DSDA having the following formula (VII) is not soluble in DMAc, NMP and DMF:

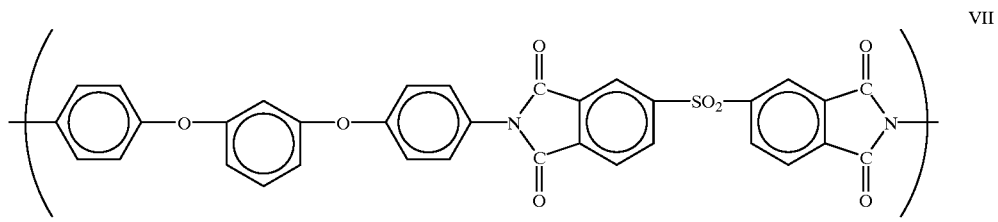

EXAMPLE 11 co-PI Prepared with Two Different Diamines and Two Different Dianhydrides

The diamine II (2.0 mmol) was dissolved in 15 mL DMAc, to the solution 1.0 mmol 6FDA was added and, 20 minutes later, 1.0 mmol 4,4'-oxydianiline (4,4'-ODA) was added while stirring. After the 4,4'-ODA was dissolved completely, 1.0 mmol PMDA and 1.0 mmol 6FDA were added. The mixture was stirred for 1 hr to form a viscous solution. A co-polyimide (VIII) was prepared from the PAA solution according to the procedures similar to those used in Example 2. The formula of the resulting co-PI (VIII) is shown as follows:

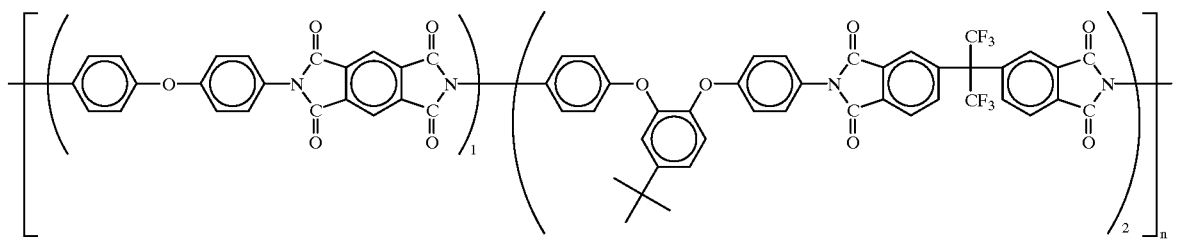

This co-Pl (VIII) has an inherent viscosity of 0.97 dl/g and is soluble in DMAc, NMP and DMF. The strength at break, elongation to break and initila modulus of co-Pl (VIII) are 88 MPa, 7% and 2.06 GPa respectively. A homopolymer of polyimide (Kapton) having the following formula is not organosoluble:

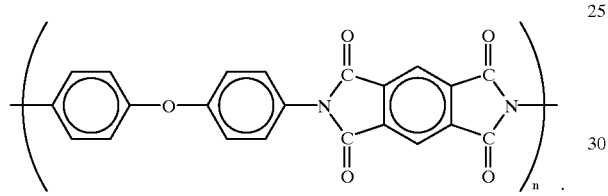

What is claimed is:

1. An organosoluble polyimide comprising units represented by the following formula (I'):

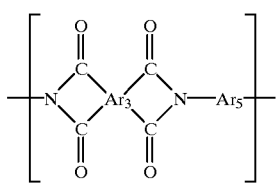

wherein $Ar_5$ is

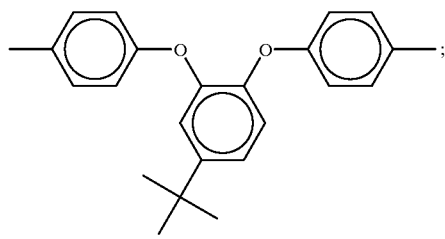

$Ar_3$ is selected from the group consisting essentially of

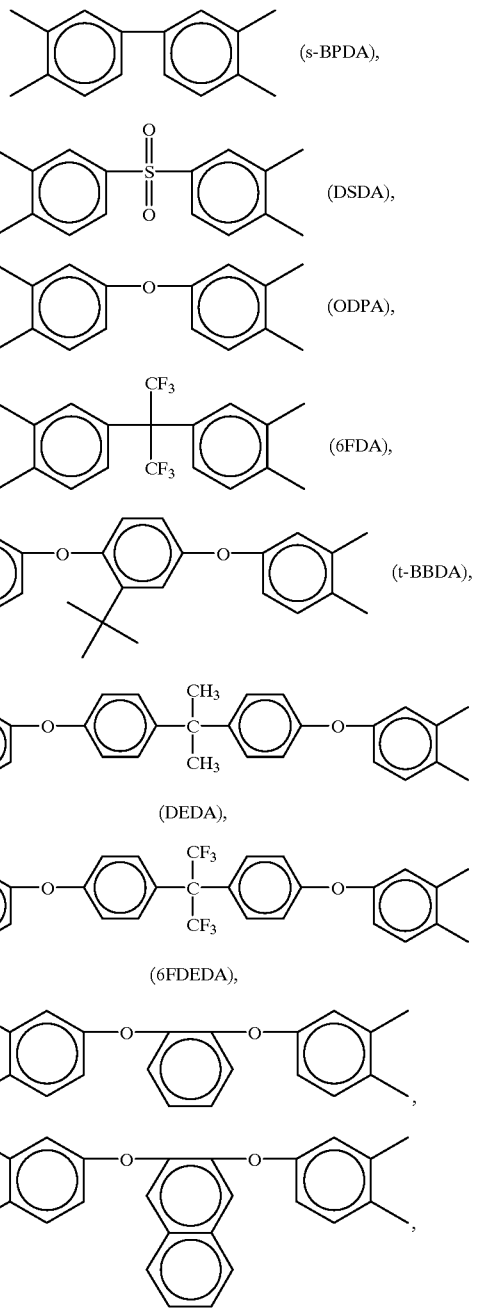

-continued

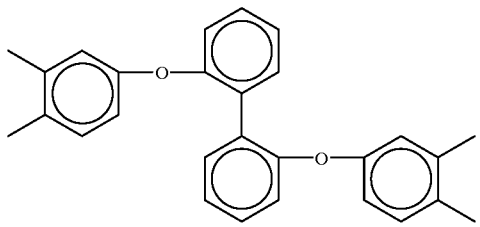

and

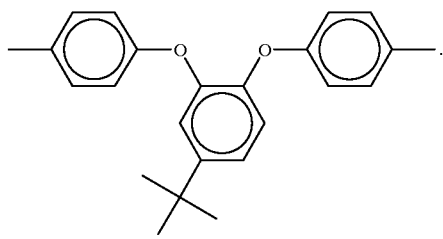

2. The polyimide according to claim 1 further comprising units represented by the following formula (I″), wherein said units (I′) and (I″) are in random (II′)

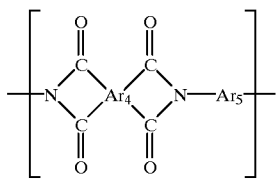

wherein $Ar_5$ has the same definition as in the formula (I′);
$Ar_4$ is

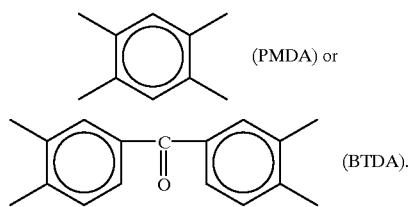

(PMDA) or (BTDA).

3. The polyimide according to claim 1 further comprising units represented by the following formula (I‴), wherein said units (I′) and (I‴) are in random (I‴)

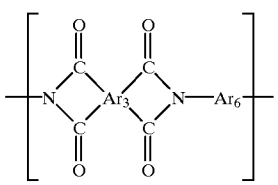

wherein $Ar_3$ has the same definition as in the formula (I′);
$Ar_6$ is

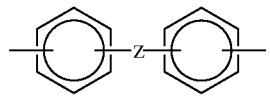

$Z=O, S, CH_2, CO, SO_2, C(Me)_2, C(CF_3)_2, CR^1R^2,$
$X—C_6H_4—X, X—C_{10}H_8—X, X—C_6R^1, R^2, R^3,$
$R^4—X, X—C_6H_4—Y—C_6H_4—X$ or a polysiloxane main chain;

wherein $X=O, S, CR^1R^2;$ and $Y=O, S, CH_2, CO, SO_2, C(Me)_2, C(CF_3)_2, CR^1R^2,$ aliphatic chain, or $C_6H_{10}$;

wherein $R^1, R^2, R^3, R^4=H$, halogen, Me, $CF_3$, or $C(Me)_3$, wherein Me=methyl group.

4. The polyimide according to claim 3 further comprising units represented by the following formula (I″) and (I‴″), wherein said units (I′), (I″), (I‴) and (I‴″) are in random, alternating or block-by-block (I″)

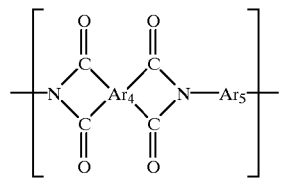

(I‴″)

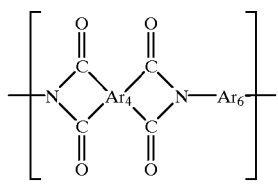

wherein $Ar_4$ is

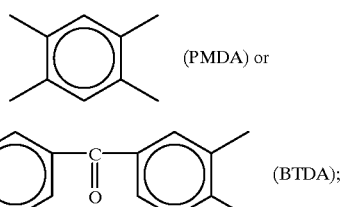

(PMDA) or (BTDA);

$Ar_5$ has the same definition as in the formula (I′); and
$Ar_6$ has the same definition as in the formula (I‴).

5. The polyimide according to claim 1, wherein $Ar_5$ is provided by 1,2-bis(4-aminophenoxy)-4-tert-butylbenzene having the following formula (II):

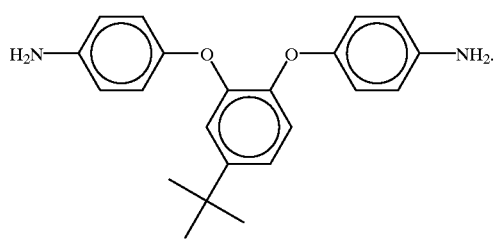
(II)

6. The polyimide according to claim 1, wherein Ar₃ is

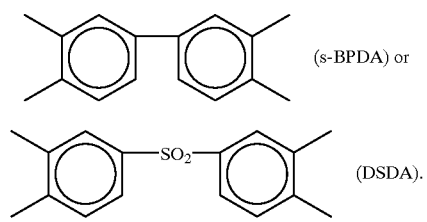
(s-BPDA) or
(DSDA).

7. The polyimide according to claim 1, wherein Ar₃ is

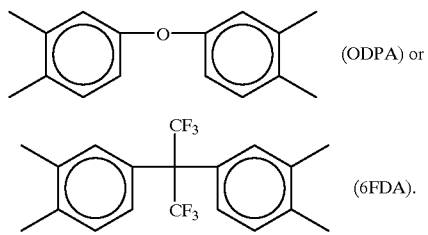
(ODPA) or
(6FDA).

8. The polyimide according to claim 1, wherein Ar₃ is

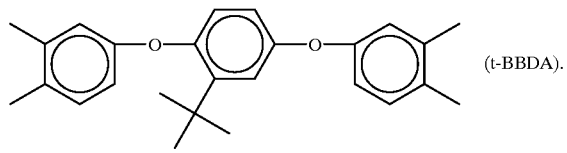
(t-BBDA).

9. The polyimide according to claim 1, wherein Ar₃ is

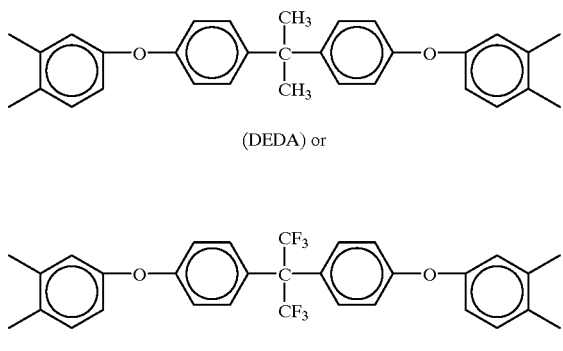
(DEDA) or
(6FDEDA).

10. The polyimide according to claim 1, wherein Ar₃ is

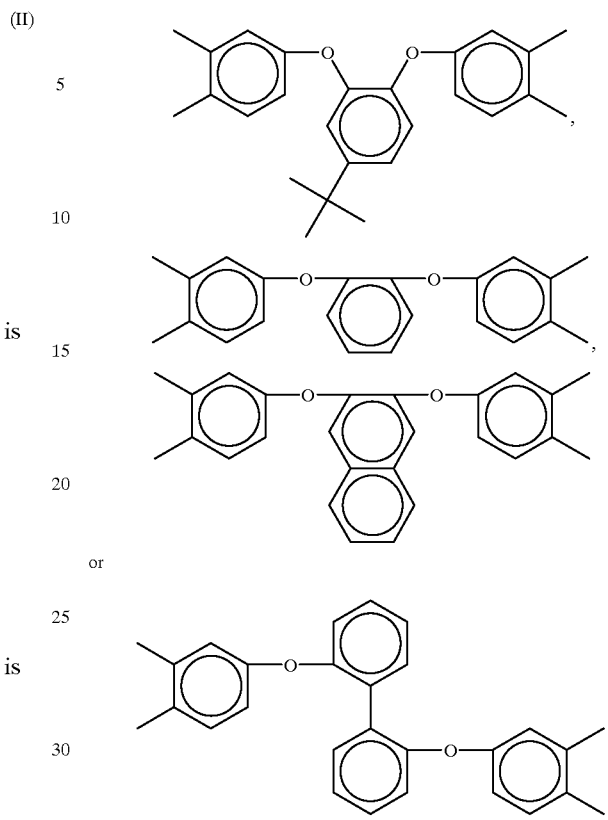

or

11. The polyimide according to claim 2, wherein Ar₃:Ar₄ (by weight)=100:0~5:95.

12. The polyimide according to claim 3, wherein Ar₅:Ar₆ (by weight)=100:0~5:95.

13. The polyimide according to claim 4, wherein Ar₃:Ar₄ (by weight)=100:0~5:95; and Ar₅:Ar₆ (by weight)= 100:0~5:95.

14. An organic solution of polyimide comprising an organic solvent and a polyimide which dissolve in said organic solvent, wherein said organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, tetrahydrofuran (THF), chloromethane, and chloroethane; and said polyimide comprises units represented by the formula (I') defined in claim 1.

15. The organic solution according to 14, wherein said polyimide further comprises units represented by the formula (I") defined in claim 2, wherein said units (I') and (I") are in random.

16. The organic solution according to 14, wherein said polyimide further comprises units represented by the formula (I''') defined in claim 3, wherein said units (I') and (I''') are in random.

17. The organic solution according to 16, wherein said polyimide further comprises units represented by the formulas (I") and (I"") both defined in claim 4, wherein said units (I'), (I"), (I''') and (I"") are in random, alternating or block-by-block.

18. The organic solution according to claim 14, wherein Ar₅ is provided by 1,2-bis(4-aminophenoxy)4-tertbutylbenzene having the following formula (II):

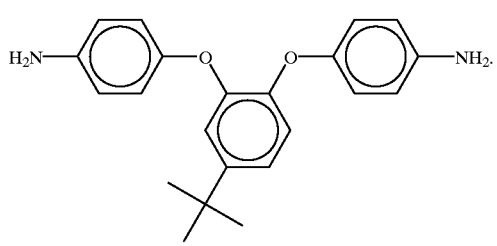

(II)

19. The organic solution according to claim 14, wherein Ar₃ is

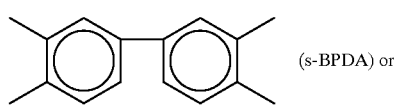

(s-BPDA) or

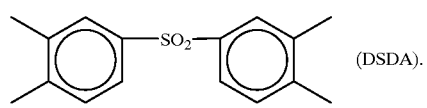

(DSDA).

20. The organic solution according to claim 14, wherein Ar₃ is

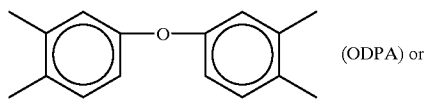

(ODPA) or

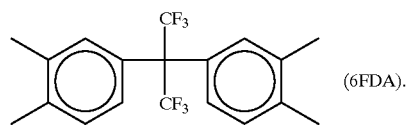

(6FDA).

21. The organic solution according to claim 14, wherein Ar₃ is

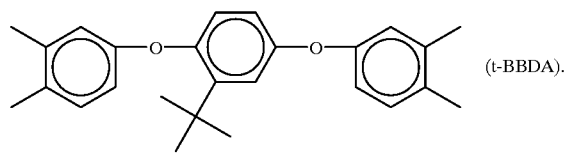

(t-BBDA).

22. The organic solution according to claim 14, wherein Ar₃ is

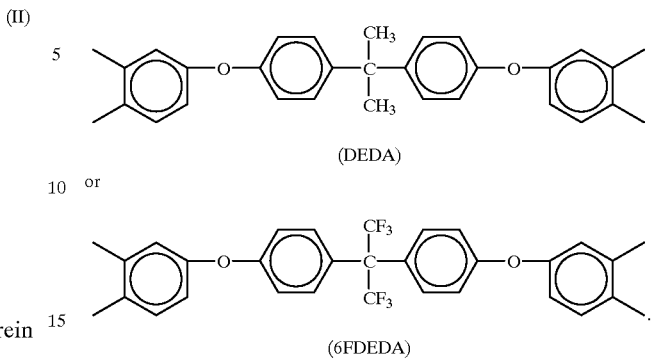

(DEDA)

or (6FDEDA)

23. The organic solution according to claim 14, wherein Ar₃ is

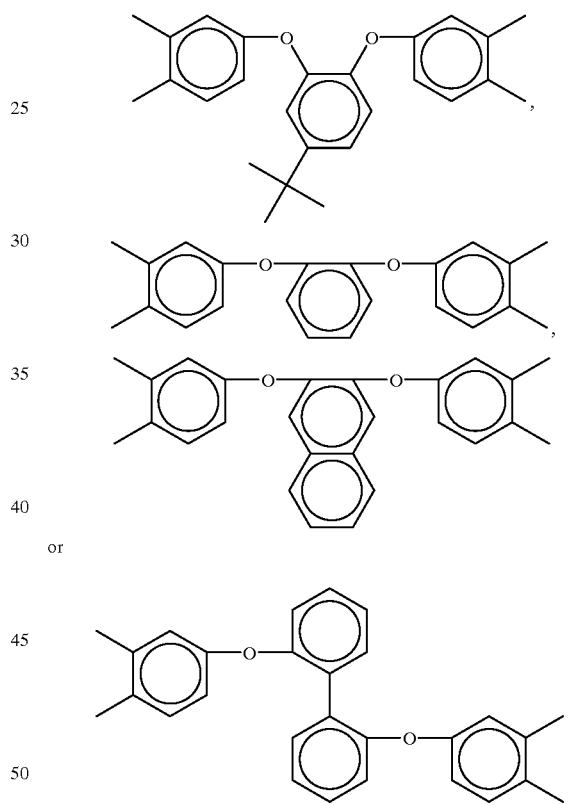

or

24. The organic solution according to claim 15, wherein Ar₃:Ar₄ (by weight)=100:0~5:95.
25. The organic solution according to claim 16, wherein Ar₅:Ar6 (by weight)=100:0~5:95.
26. The organic solution according to claim 18, wherein Ar₃:Ar₄ (by weight)=100:0~5:95; and Ar₅:Ar₆ (by weight)= 100:0~5:95.

* * * * *

UNITED STATES PATENT AND TRADEMARK OFFICE
CERTIFICATE OF CORRECTION

PATENT NO.   : 6,277,950 B1
DATED        : August 21, 2001
INVENTOR(S)  : Chin-Ping Yang, Shen-Huei Hsiao and Shin-Hung Chen It is certified that error appears in the above-identified patent and that said Letters Patent is hereby corrected as shown below:

<u>Title page,</u>
Item [73], the name of the Assignee is Tatung University, Taipei (TW)

Signed and Sealed this

Eleventh Day of June, 2002

*Attest:*

*Attesting Officer*

JAMES E. ROGAN
*Director of the United States Patent and Trademark Office*